United States Patent
Kyono (10) Patent No.: US 7,375,987 B2
(45) Date of Patent: May 20, 2008

(54) RESONANT SWITCHING POWER SOURCE APPARATUS

(75) Inventor: Yoichi Kyono, Niiza (JP)

(73) Assignee: Sanken Electric Co., Ltd., Niiza-shi (JP)

(*) Notice: Subject to any disclaimer, the term of this patent is extended or adjusted under 35 U.S.C. 154(b) by 0 days.

(21) Appl. No.: 11/621,284

(22) Filed: Jan. 9, 2007

(65) Prior Publication Data

US 2007/0165426 A1 Jul. 19, 2007

(30) Foreign Application Priority Data

Jan. 16, 2006 (JP) ............................. 2006-007879

(51) Int. Cl.
H02M 7/523 (2006.01)
H02M 3/335 (2006.01)

(52) U.S. Cl. ..................................... 363/21.02; 363/98

(58) Field of Classification Search ............. 363/21.02, 363/21.03, 21.09, 21.17, 97, 98
See application file for complete search history.

(56) References Cited

U.S. PATENT DOCUMENTS

| | | | | |
|---|---|---|---|---|
| 5,986,895 A * | 11/1999 | Stewart et al. | ................ | 363/16 |
| 6,154,375 A * | 11/2000 | Majid et al. | ................ | 363/16 |
| 6,215,675 B1 * | 4/2001 | Laeuffer et al. | ............... | 363/17 |
| 6,683,800 B2 * | 1/2004 | Loef et al. | ................ | 363/49 |
| 6,711,034 B2 * | 3/2004 | Duerbaum et al. | ............ | 363/16 |
| 7,116,561 B2 * | 10/2006 | Osaka | ..................... | 363/21.02 |
| 7,313,004 B1 * | 12/2007 | Yang et al. | ............... | 363/21.02 |
| 2004/0012985 A1 * | 1/2004 | Ribarich | .................. | 363/21.02 |
| 2006/0098464 A1 | 5/2006 | Osaka et al. | | |
| 2006/0291117 A1 | 12/2006 | Kyono | | |

FOREIGN PATENT DOCUMENTS

JP 2003-299351 10/2003

OTHER PUBLICATIONS

U.S. Appl. No. 11/610,626, filed Dec. 14, 2006, Kyono.
U.S. Appl. No. 11/621,284, filed Jan. 9, 2007, Kyono.

* cited by examiner

Primary Examiner—Gary L. Laxton
(74) Attorney, Agent, or Firm—Oblon, Spivak, McClelland, Maier & Neustadt, P.C.

(57) ABSTRACT

A resonant switching power source apparatus has a first switching element and second switching element being connected in series between output terminals of a DC power source and are alternately turned on and off; a series resonant circuit having a primary winding of a transformer and a current resonance capacitor and connected in parallel with the second switching element; a controller to control the first and second switching elements; a rectifying/smoothing circuit to rectify and smooth a voltage, which is generated on a secondary winding of the transformer during an ON period of the second switching element, and output the rectified-smoothed voltage; a current detector to detect a current passing through the series resonant circuit; and an overcurrent protector to turn off the first and second switching elements for a predetermined period so that excitation energy of the transformer is reset, if the current detector detects a predetermined current value.

7 Claims, 10 Drawing Sheets

RESONANT SWITCHING POWER SOURCE APPARATUS

BACKGROUND OF THE INVENTION

1. Field of the Invention

The present invention relates to a resonant switching power source apparatus having an overcurrent protection function, and particularly, to a technique of activating the overcurrent protection function even in a case where an output voltage is below a working voltage.

2. Description of the Related Art

Figure 1:
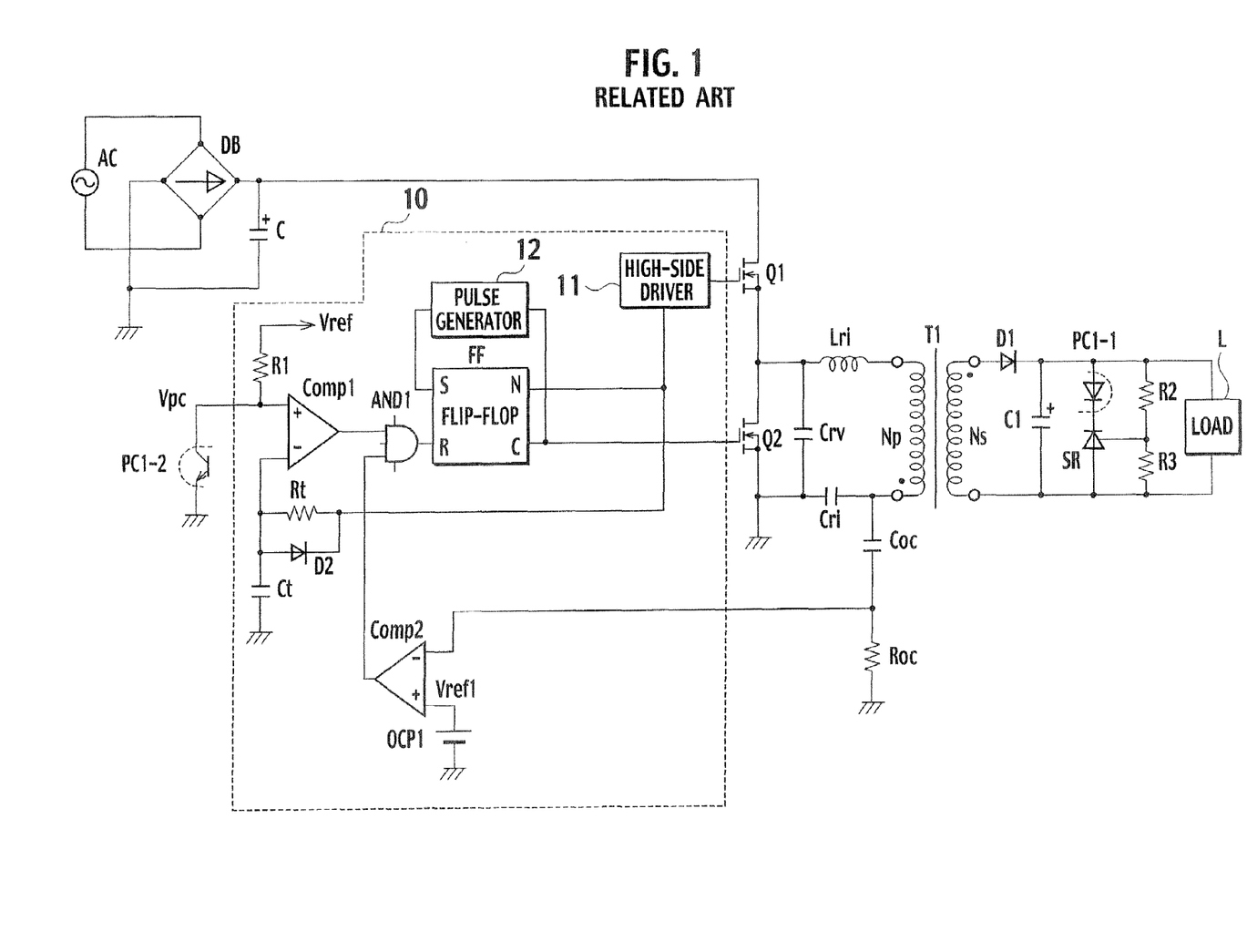
FIG. 1 is a circuit diagram showing a resonant switching power source apparatus according to a related art.

FIG. 1 is a circuit diagram showing a resonant switching power source apparatus according to a related art. The power source apparatus includes a diode bridge circuit DB to rectify an output from an AC power source AC and a smoothing capacitor C to smooth the rectified output and provide DC source power. Between terminals of the capacitor C that supplies the DC source power, there are a first switching element Q1 and second switching element Q2 that are connected in series. The first and second switching elements Q1 and Q2 are, for example, MOSFETs.

Between the source and drain of the second switching element Q2, there are connected a voltage resonant capacitor Crv, a resonant reactor Lri, and a series resonant circuit including a primary winding Np of a transformer T1 and a current resonant capacitor Cri. The resonant reactor Lri may be a leakage inductance of the transformer T1. Between terminals of a second winding Ns of the transformer T1, there is connected a rectifying/smoothing circuit including a diode D1 and a capacitor C1 that are connected in series. The rectifying/smoothing circuit rectifies and smoothes a voltage generated on the secondary winding Ns of the transformer T1. A voltage (terminal voltage of the capacitor C1) provided by the rectifying/smoothing circuit is an output voltage supplied to a load L.

Between terminals of the capacitor C1, there is connected an output voltage detector including a resistor R2, a resistor R3, a shunt regulator SR, and a photocoupler emitter PC1-1. In the output voltage detector, the resistors R2 and R3 divide the output voltage into a divided voltage that is sent to the shunt regulator SR. The shunt regulator SR internally compares the divided voltage with a reference voltage and provides a current representative of a differential voltage (hereinafter referred to as "error voltage") to the photocoupler emitter PC1-1.

A photocoupler receiver PC1-2 has a first end connected through a resistor R1 to a reference power source Vref (not shown) that is incorporated in a controller 110. A second end of the photocoupler receiver PC1-2 is grounded. The photocoupler receiver PC1-2 generates a voltage Vpc in response to the error voltage detected by and transmitted from the output voltage detector. The voltage Vpc is supplied to a non-inverting input terminal (+) of a comparator Comp1. An inverting input terminal (−) of the comparator Comp1 is connected to a first end of a capacitor Ct. A second end of the capacitor Ct is grounded. The first end of the capacitor Ct is also connected to a first end of a resistor Rt. A second end of the resistor Rt is connected to an output terminal N of a flip-flop FF. An output terminal of the comparator Comp1 is connected to a first input terminal of an AND gate AND1.

The resistor Rt is connected in parallel with a diode D2. An anode of the diode D2 is connected to the first end of the resistor Rt and a cathode of the diode D2 is connected to the second end of the resistor Rt. The output terminal N of the flip-flop FF is connected to a high-side driver 11. An inverting output terminal C of the flip-flop FF is connected to the second switching element Q2. The inverting output terminal C of the flip-flop FF is also connected to an input terminal of a pulse generator 12. An output terminal of the pulse generator 12 is connected to a set terminal S of the flip-flop FF.

Operation of the resonant switching power source apparatus with the above-mentioned configuration will be explained. If the output terminal N of the flip-flop FF is at high level, the capacitor Ct is charged through the resistor Rt and the first switching element Q1 is driven through the high-side driver 11. Namely, the first switching element Q1 turns on. At this time, the inverting output terminal C of the flip-flop FF is at low level to turn off the second switching element Q2. The capacitor Ct is continuously charged, and when a voltage Vct of the capacitor Ct reaches the voltage Vpc of the photocoupler receiver PC1-2, the comparator Comp1 provides a low-level output.

The output of the comparator Comp1 is supplied to the first input terminal of the AND gate AND1. A second input terminal of the AND gate AND1 is connected to an overcurrent detector to be explained later. In a normal state, the second input terminal of the AND gate AND1 receives a high-level signal and the output of the comparator Comp1 is supplied to a reset terminal R (negative logic input) of the flip-flop FF, to reset the flip-flop FF. As a result, the output terminal N of the flip-flop FF becomes low and the inverting output terminal C thereof becomes high.

Switching operation of the first and second switching elements Q1 and Q2 is controlled to have a dead time in which the first and second switching elements Q1 and Q2 are both OFF by a circuit (not shown) that delays ON timing of the elements Q1 and Q2.

When the output terminal N of the flip-flop FF becomes low, the first switching element Q1 turns off and the capacitor Ct is rapidly discharged through the diode D2. As a result, the output of the comparator Comp1 again becomes high. Then, the inverting output terminal C of the flip-flop FF becomes high to turn on the second switching element Q2 and provide the pulse generator 12 with a high-level signal.

In response to the high-level signal, the pulse generator 12 sends, after a predetermined period, a low-level signal to the set terminal S (negative logic input) of the flip-flop FF. As a result, the output terminal N of the flip-flop FF becomes high to again turn on the first switching element Q1 and start charging the capacitor Ct through the resistor Rt. At this time, the inverting output terminal C of the flip-flop FF becomes low to turn off the second switching element Q2.

The above-mentioned operation is repeated with an ON period of the first switching element Q1 being determined according to an error voltage detected by the output voltage detector. The predetermined period generated by the pulse generator 12, i.e., a period starting when the pulse generator 12 receives a high-level signal and ending when the pulse generator 12 sets the flip-flop FF determines an ON period of the second switching element Q2. With these ON periods, the first and second switching elements Q1 and Q2 are alternately turned on and off.

The overcurrent detector includes a capacitor Coc, a resistor Roc, a comparator Comp2, and a reference power source OCP1. An overcurrent protector is served by the AND gate AND1 that resets the flip-flop FF in response to an output from the overcurrent detector, thereby turning off the first switching element Q1.

The capacitor Coc and resistor Roc in the overcurrent detector form a series circuit that is connected in parallel with the current resonant capacitor Cri. A non-inverting input terminal (+) of the comparator Comp2 is connected to the reference power source OCP1 that supplies a reference voltage Vref1. An inverting input terminal (−) of the comparator Comp2 is connected to a connection point between the capacitor Coc and the resistor Roc. An output terminal of the comparator Comp2 is connected to a second input terminal of the AND gate AND1.

A current passes through a path extending along the series resonant circuit having the resonant reactor Lri, the primary winding Np of the transformer T1, and the current resonant capacitor Cri, in which a part of the current passes through the capacitor Coc in a manner of a capacitance ratio of the current resonant capacitor Cri and the capacitor Coc. Accordingly, the resistor Roc generates a voltage corresponding to the current passing through the series resonant circuit.

The voltage generated by the resistor Roc is supplied to the inverting input terminal (−) of the comparator Comp2 and is compared with the reference voltage Vref1 of the reference power source OCP1. An output from the comparator Comp2 is supplied to the second input terminal of the AND gate AND1. The AND gate AND1 provides an AND of the output of the comparator Comp1 and the output of the comparator Comp2 and the comparison result is sent to the reset terminal R of the flip-flop FF.

After the first switching element Q1 is turned on, a current passing through the series resonant circuit may increase so that a voltage generated by the resistor Roc reaches the reference voltage Vref1 generated by the reference power source OCP1. Then, the flip-flop FF is reset to turn off the first switching element Q1. This results in restricting the charging of the current resonant capacitor Cri, to restrict power transmitted to the secondary side. This is the overcurrent protection function that limits power supplied to the load L according to a current passing through the series resonant circuit.

Figure 2:
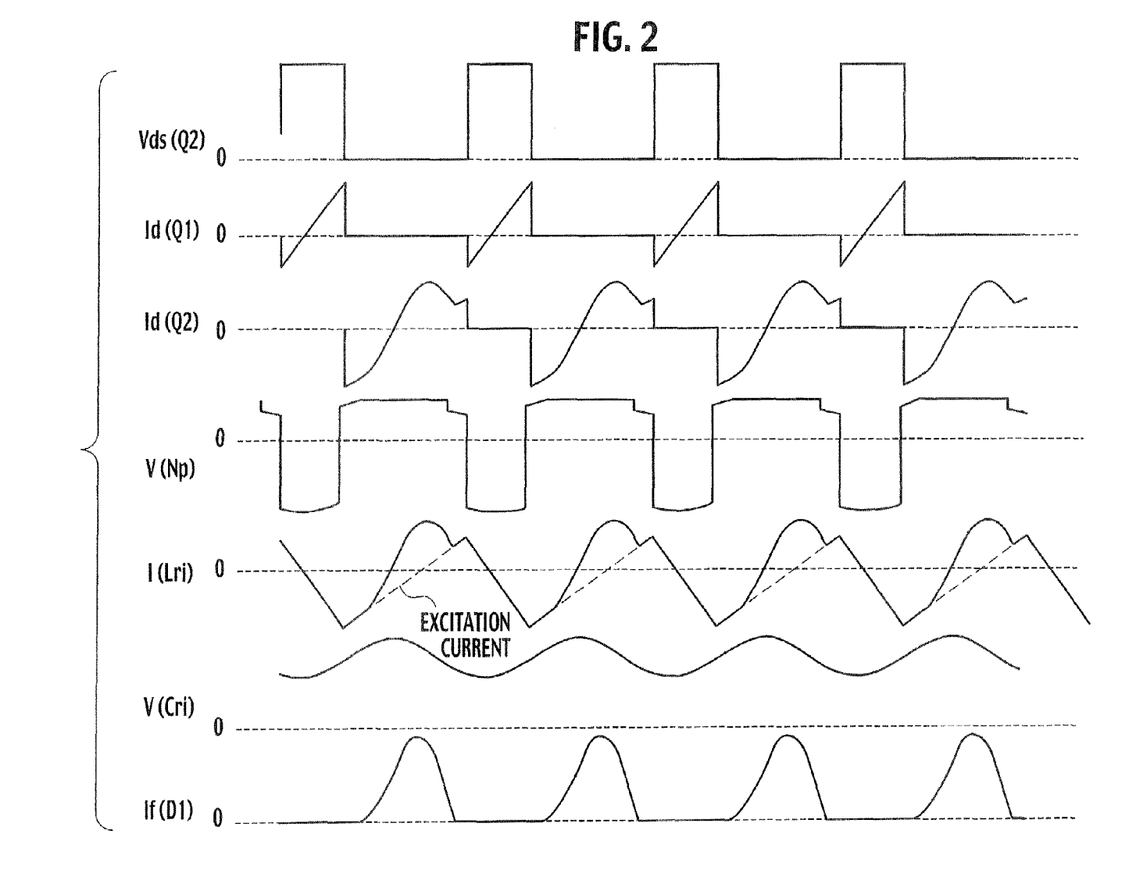
FIG. 2 shows operational waveforms in a steady state of the apparatus according to the related art.
Figure 3:
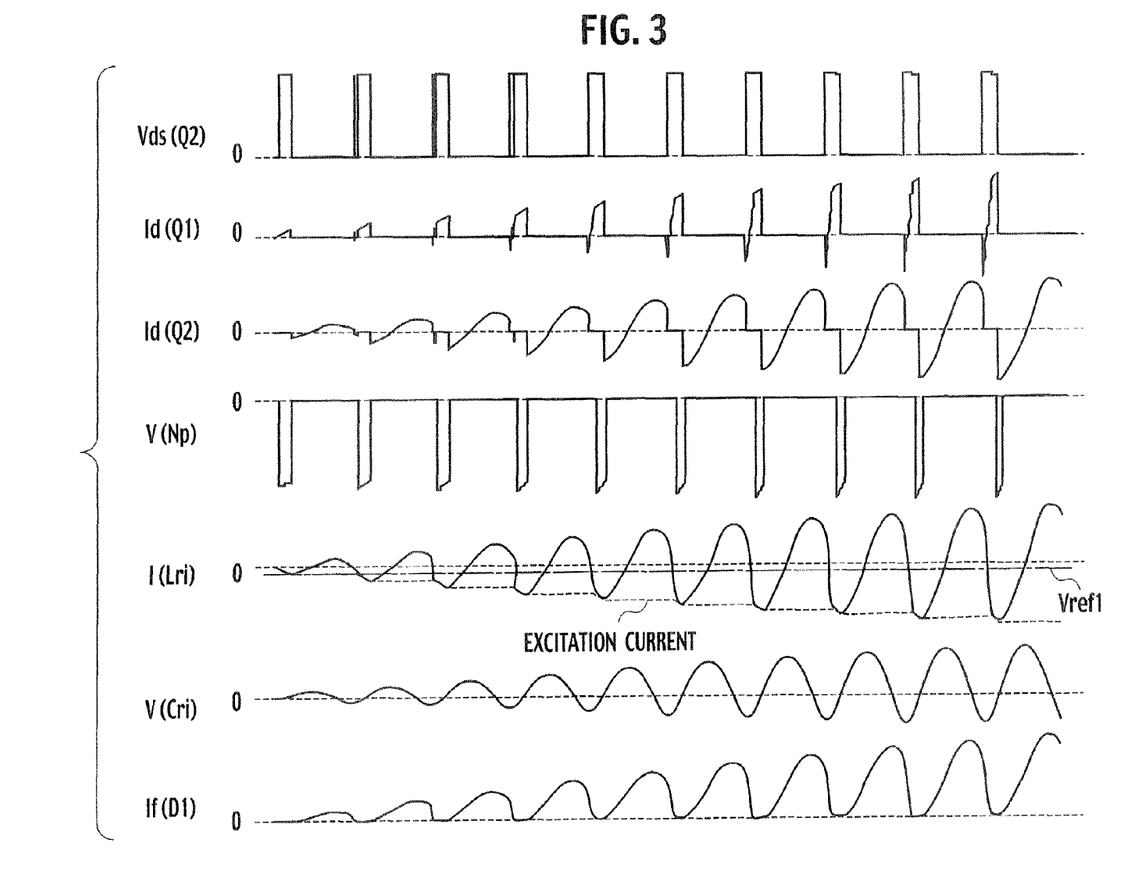
FIG. 3 shows operational waveforms in an overload state of the apparatus according to the related art.

FIG. 2 shows operational waveforms in a steady state of the switching power source apparatus of FIG. 1. FIG. 3 shows operational waveforms in an overload state of the same. In FIGS. 2 and 3, Vds(Q2) is a drain-source voltage of the second switching element Q2, Id(Q1) is a drain current of the first switching element Q1, Id(Q2) is a drain current of the second switching element Q2, and If(D1) is a current passing through the diode D1.

In response to signals generated by the controller 110, the first and second switching elements Q1 and Q2 alternately turn on and off with a dead time of about several hundreds of nanoseconds. During an ON period of the first switching element Q1, the current resonant capacitor Cri is charged through the resonant reactor Lri and the primary winding Np of the transformer T1. During an ON period of the second switching element Q2, excitation energy accumulated in an excitation inductance of the transformer T1 is released.

In the ON period of the second switching element Q2, the primary winding Np of the transformer T1 receives a voltage V(Np) provided by dividing a voltage V(Cri) of the current resonant capacitor Cri by an inductance of the primary winding Np and the resonant reactor Lri. The voltage V(Np) of the primary winding Np is clamped when it reaches a value defined by Vo(np/ns), where np is the number of turns of the primary winding Np, ns is the number of turns of the secondary winding Ns, and Vo is an output voltage. A resonant current generated by the current resonant capacitor Cri and resonant reactor Lri is sent to the secondary side. If the voltage V(Np) of the primary winding Np decreases below the value of Vo(np/ns), no energy is transmitted to the secondary side. Instead, the resonant current passes through the series resonant circuit having the resonant reactor Lri, the primary winding Np of the transformer T1, and the current resonant capacitor Cri.

In a normal state of the resonant switching power source apparatus according to the related art, excitation energy is accumulated in the primary winding Np of the transformer T1 during an ON period of the first switching element Q1, and during an ON period of the second switching element Q2, the accumulated energy is reset when the primary winding Np generates a voltage V(Np) defined by Vo(np/ns). As a result, the excitation current returns to a level that is attained just before the first switching element Q1 is turned on, as indicated with a dotted line in the waveform of a current I(Lri) passing through the resonant reactor Lri.

SUMMARY OF THE INVENTION

At the start of the power source apparatus of FIG. 1 or at an occurrence of a load short circuit, an output voltage of the apparatus sharply drops. In this case, the primary winding Np of the transformer T1 generates a low voltage as shown in the waveform V(Np) of FIG. 3 to insufficiently reset excitation energy. As a result, an excitation current increases on one side (negative side in FIG. 3) as indicated with a dotted line in the waveform I(Lri) of FIG. 3, to cause biased magnetization. This may pass a large current to break the first switching element Q1 or the second switching element Q2 when the switching element is turned on.

To prevent this, the related art of FIG. 1 employs the overcurrent protector to limit a current by turning off the first switching element Q1 if a current passing to the first switching element Q1 reaches a predetermined value. If an output voltage of the power source apparatus drops to bias an excitation current to one side at the time of, for example, staring the apparatus, a current passing through the primary winding Np returns to the excitation current along a slope whose inclination is determined by the resonant reactor Lri and voltage resonant capacitor Crv. As a result, the excitation current passes until the overcurrent protector responds, so that a current to the first switching element Q1 is unrestricted and the excitation current continuously increases.

Japanese Unexamined Patent Application Publication No. 2003-299351 discloses a switching power source apparatus that changes a reference voltage for an overcurrent detector if an output voltage decreases, to activate an overcurrent protector with a current corresponding to the decreased output voltage.

The switching power source apparatus of this disclosure includes a voltage level detection comparator to output a voltage-level-change signal of high level if the voltage level of a detection signal from an output voltage detector drops lower than a reference voltage level provided by a reference power source. The disclosed apparatus also includes a voltage level changer to decrease the absolute level of the reference voltage provided by the reference power source in response to the voltage-level-change signal from the voltage level detection comparator. In an overload state or a load short circuit state, or at the start of the apparatus, the disclosure more strongly limits currents passing through primary and secondary winding sides of a transformer, to release electric stress from parts on the primary and secondary sides.

This disclosure, however, gives no consideration on resetting excitation energy of the transformer, and therefore, is unable to solve the biased magnetization problem of the transformer when applied to the resonant switching power source apparatus of FIG. 1. Namely, the disclosure is unable to solve the problem that an excessive excitation current passes through the series resonant circuit to break any one of the first and second switching elements Q1 and Q2 when the switching element is turned on.

According to the present invention, a resonant switching power source apparatus capable of preventing an excessive current from passing through switching elements can be provided, thereby breakage of the switching elements can be prevented.

According to a technical aspect of the present invention, provided is a resonant switching power source apparatus having a first switching element and second switching element that are connected in series between output terminals of a DC power source and are alternately turned on and off; a series resonant circuit containing a primary winding of a transformer and a current resonance capacitor and connected in parallel with the second switching element; a controller to control ON/OFF operation of the first and second switching elements; a rectifying/smoothing circuit to rectify and smooth a voltage, which is generated on a secondary winding of the transformer during an ON period of the second switching element, and output the rectified-smoothed voltage; a current detector to detect a current passing through the series resonant circuit; and an overcurrent protector to turn off the first and second switching elements for a predetermined period so that excitation energy of the transformer is reset, if the current detector detects a predetermined current value.

DESCRIPTION OF THE PREFERRED EMBODIMENT

Embodiments of the present invention will be explained.

First Embodiment

Figure 4:
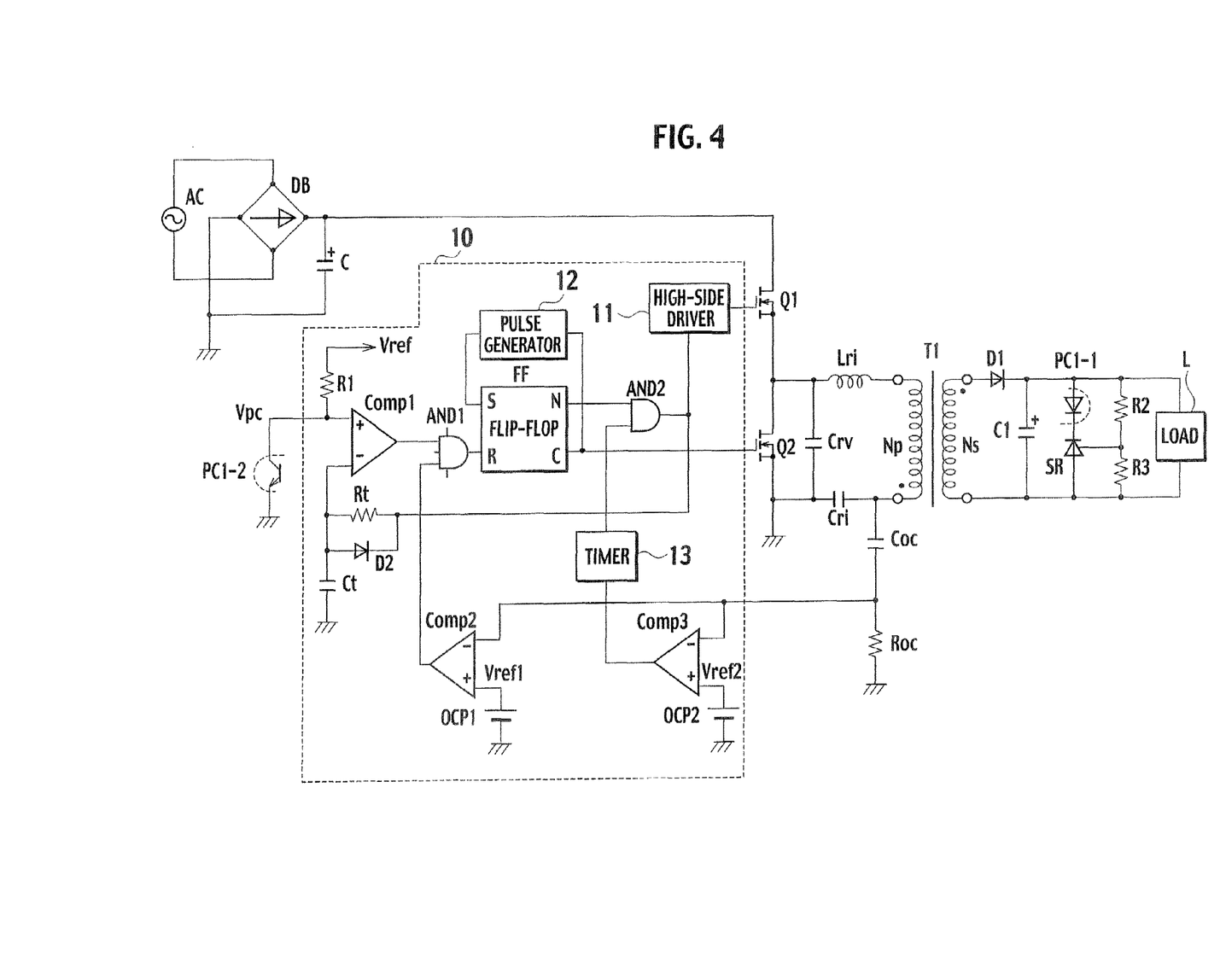
FIG. 4 is a circuit diagram showing a resonant switching power source apparatus according to a first embodiment of the present invention.

FIG. 4 is a circuit diagram showing a resonant switching power source apparatus according to the first embodiment of the present invention. In addition to the controller 110 of the resonant switching power source apparatus of the related art shown in FIG. 1, a controller 10 of the resonant switching power source apparatus of the first embodiment includes an AND gate AND2, a timer 13, a comparator Comp3, and a reference power source OCP2.

According to the first embodiment of the present invention, a first overcurrent detector includes a capacitor Coc, a resistor Roc, a comparator Comp2, and a reference power source OCP1. A first overcurrent protector includes an AND gate AND1. A second overcurrent detector includes the capacitor Coc, the resistor Roc, the comparator Comp3, and the reference power source OCP2. A second overcurrent protector includes the timer 13 and the AND gate AND2.

Among parts shown in FIG. 4 those that are the same as those of the related art of FIG. 1 will not be explained and different ones will be explained.

A first input terminal of the AND gate AND2 is connected to an output terminal N of a flip-flop FF and a second input terminal thereof is connected to an output terminal of the timer 13. An output terminal of the AND gate AND2 is connected to a high-side driver 11.

A non-inverting input terminal (+) of the comparator Comp3 is connected to the reference power source OCP2 that supplies a reference voltage Vref2. The reference voltage Vref2 is higher than a reference voltage Vref1 provided by the reference power source OCP1. An inverting input terminal (−) of the comparator Comp3 is connected to a connection point between the capacitor Coc and the resistor Roc, to receive a voltage representative of a current passing through a series resonant circuit. An output terminal of the comparator Comp3 is connected to the timer 13. When the voltage representative of the current passing through the series resonant circuit exceeds the reference voltage Vref2, the comparator Comp3 supplies a low-level signal to the timer 13.

Receiving the low-level signal from the comparator Comp3, the timer 13 provides a low-level output and holds it for a predetermined period. The output of the timer 13 is supplied to the second input terminal of the AND gate AND2. In a steady state, the voltage of the resistor Roc is below the reference voltage Vref2, and therefore, the timer 13 provides a high-level output to achieve the same operation as that of the related art shown in FIG. 1.

If an output voltage of the power source apparatus greatly drops at the start of the apparatus or a load short circuit, an excitation current of a primary winding Np of a transformer T1 will deviate to positive or negative side to bias magnetization. Then, a current passing during an ON period of a switching element Q1 becomes steeper so that the overcurrent protector, i.e., the AND gate AND1 is unable to suppress the same due to a delay time of the controller 10. As a result, the current of the primary winding Np increases, and when the voltage of the resistor Roc reaches the reference voltage Vref2, the comparator Comp3 provides a low-level output to make the timer 13 provide a low-level output for the predetermined period.

During the period in which the timer 13 holds the low-level output, the AND gate AND2 keeps providing a low-level output to continuously turn off the first switching element Q1. After the predetermined period, the timer 13 resumes a high-level output so that the AND gate AND2 provides a high-level output to make the first switching element Q1 operative through the high-side driver 11.

Figure 5:
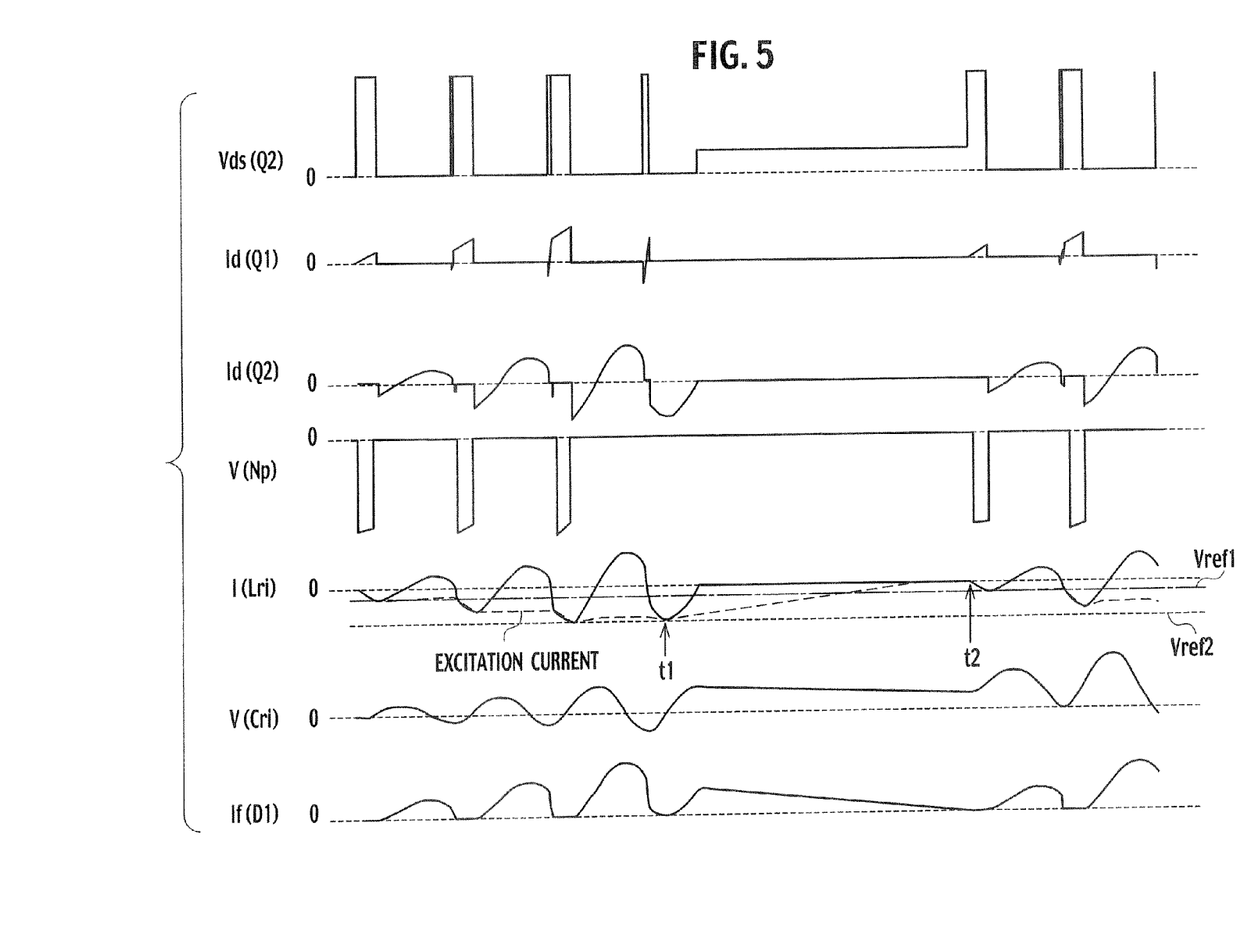
FIG. 5 shows operational waveforms of the apparatus according to the first embodiment.

FIG. 5 shows operational waveforms of the switching power source apparatus according to the first embodiment shown in FIG. 4. At the start of the apparatus, an output voltage is low so that an excitation current of the primary winding Np indicated with a dotted line in FIG. 5 is not completely reset during an ON period of a second switching element Q2, and therefore, gradually increases. At time t1, the voltage of the resistor Roc reaches the reference voltage Vref2 and the first switching element Q1 is kept in an OFF state for the predetermined period. During this period, the first switching element Q1 is not turned on even at the ON timing of the first switching element Q1 specified by the flip-flop FF. Consequently, the first and second switching elements Q1 and Q2 are kept off (inoperative condition) for the predetermined period. During this period, the excitation current is gradually reset through a body diode of the second switching element Q2.

After passing the predetermined period from t1, the first switching element Q1 again turns on at time t2. At this time, the excitation current of the primary winding Np has already been reset, and therefore, no steep current flows but the current gradually increases. The above-mentioned operation is repeated to send energy to the secondary side. If the output voltage of the apparatus increases to some extent, the excitation current will be completely reset within an ON period of the second switching element Q2, to thereby establish a normal operation.

Second Embodiment

Figure 6:
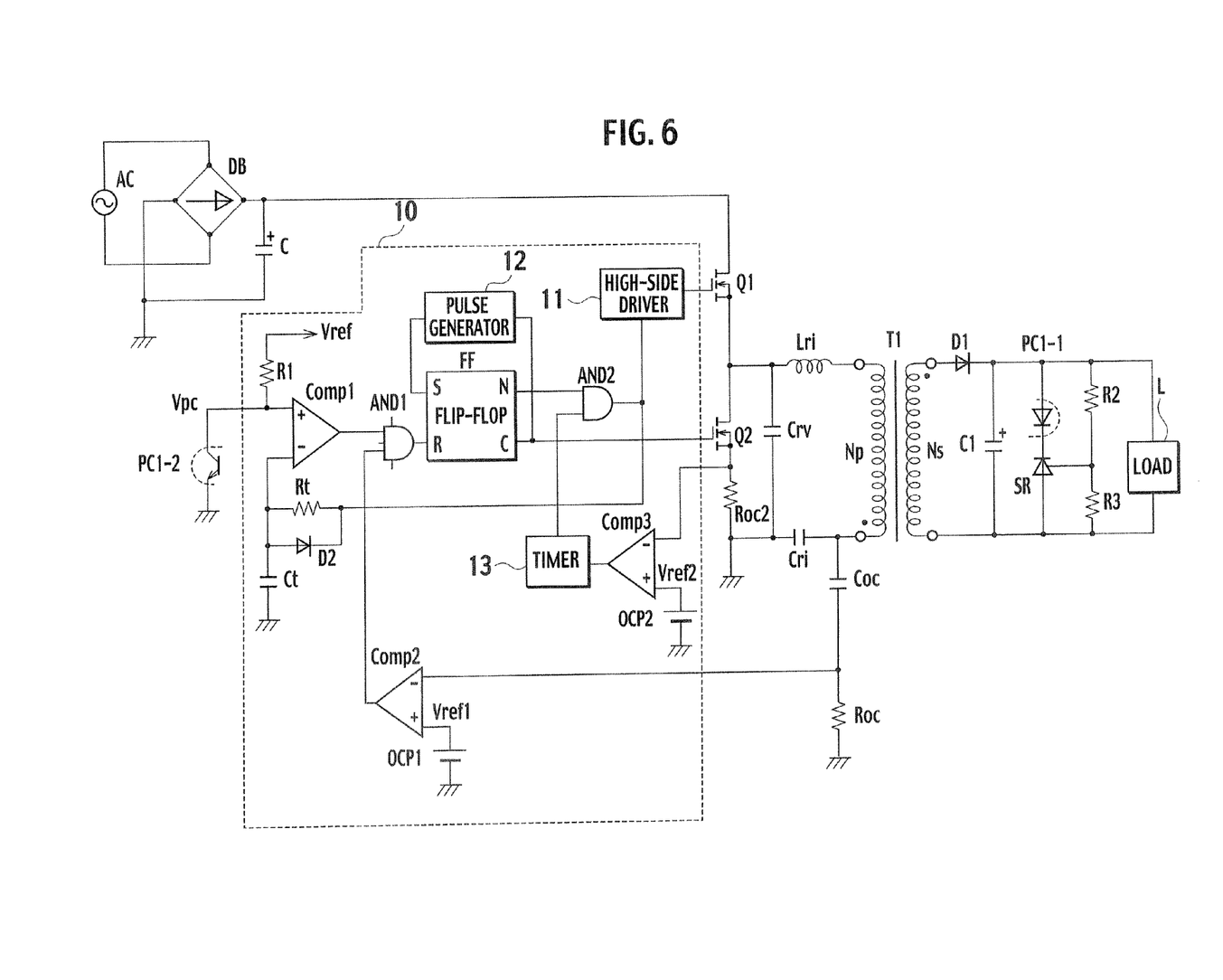
FIG. 6 is a circuit diagram showing a resonant switching power source apparatus according to a second embodiment of the present invention.

FIG. 6 is a circuit diagram showing a resonant switching power source apparatus according to the second embodiment of the present invention. This embodiment is based on the first embodiment shown in FIG. 4, and therefore, the same parts as those of the first embodiment are represented with the same reference marks to omit or simplify their explanations. Compared with the first embodiment, the second embodiment additionally has a current detection resistor Roc 2 between the source of the second switching element Q2 and the ground and the inverting input terminal (−) of the comparator Comp3 is connected to a connection point between the source of the second switching element Q2 and the resistor Roc2.

Figure 7:
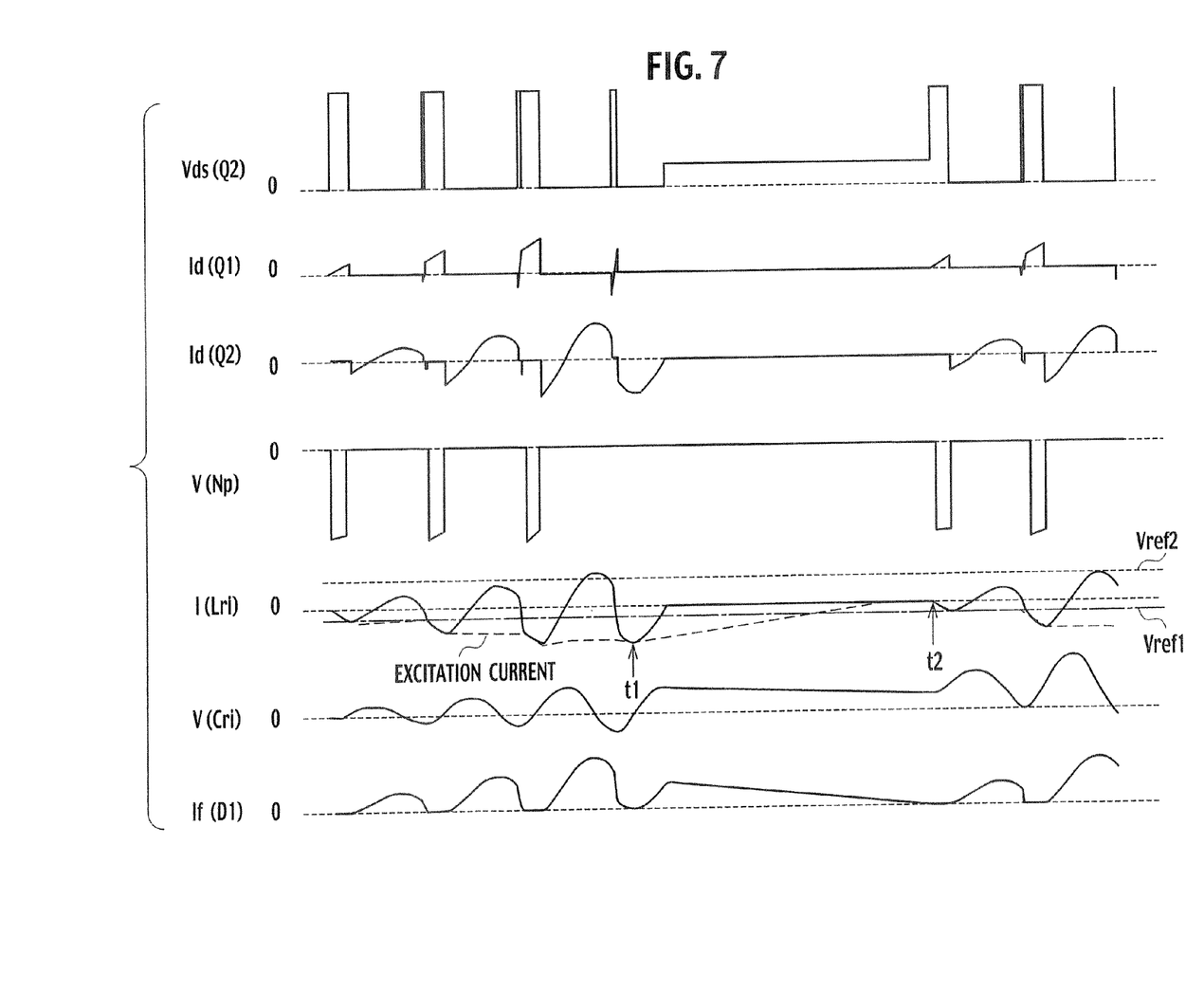
FIG. 7 shows operational waveforms of the apparatus according to the second embodiment.

FIG. 7 shows operational waveforms of the second embodiment. As explained above, an output voltage of the power source apparatus is low at the start of the apparatus, and therefore, an excitation current of the primary winding Np is not reset within an ON period of the second switching element Q2, to thereby gradually increase a switching current when the first switching element Q1 is turned on. Due to the increase in the switching current of the first switching element Q1, a current to be passed when the second switching element Q2 is turned on increases.

If the switching current of the second switching element Q2 in operative condition increases sharply so that the voltage of the resistor Roc2 reaches the reference voltage Vref2 at time t1, the first switching element Q1 is kept in an OFF state (inoperative condition) for a predetermined period, like the first embodiment. Namely, during this period, the first switching element Q1 is not turned on even at the ON timing of the first switching element Q1 specified by the flip-flop FF. Consequently, the first and second switching elements Q1 and Q2 are kept off for the predetermined period. During this period, the excitation current is gradually reset through a body diode of the second switching element Q2.

After passing the predetermined period from t1, the first switching element Q1 again turns on at time t2. At this time, the excitation current of the primary winding Np has already been reset, and therefore, no steep current flows but the current gradually increases. The above-mentioned operation is repeated to send energy to the secondary side. If the output voltage of the apparatus increases to some extent, the excitation current will be completely reset within an ON period of the second switching element Q2, to thereby establish a normal operation.

Third Embodiment

Figure 8:
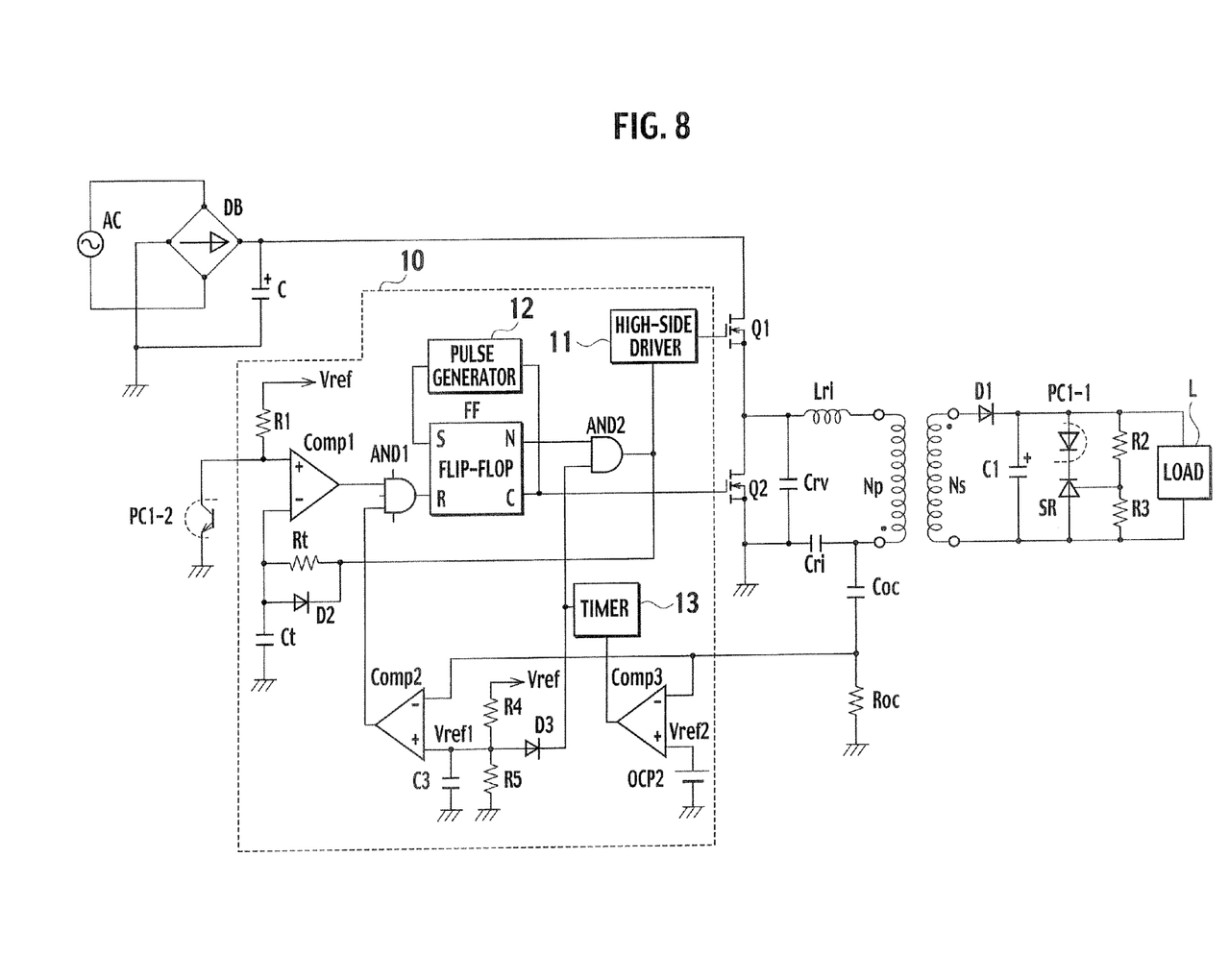
FIG. 8 is a circuit diagram showing a resonant switching power source apparatus according to a third embodiment of the present invention.

A resonant switching power source apparatus according to the third embodiment of the present invention employs a soft start circuit to suppress a current increase at the start of the apparatus, thereby preventing an excessive current from passing to the first and second switching elements Q1 and Q2.

FIG. 8 is a circuit diagram showing the resonant switching power source apparatus according to the third embodiment. This embodiment is based on the first embodiment shown in FIG. 4, and therefore, the same parts as those of the first embodiment are represented with the same reference marks to omit or simplify their explanations. The third embodiment removes the reference power source OCP1 from the first embodiment and employs the soft start circuit including a resistor R4, a resistor R5, a capacitor C3, and a diode D3. The soft start circuit supplies a voltage divided by the resistors R4 and R5 instead of the reference voltage Vref1 of the first embodiment.

The resistors R4 and R5 are connected in series and are arranged between a reference power source Vref (not shown) and the ground. A connection point between the resistors R4 and R5 is connected to the non-inverting input terminal (+) of the comparator Comp2. The capacitor C3 is connected in parallel with the resistor R5. An anode of the diode D3 is connected to the non-inverting input terminal (+) of the comparator Comp2 and a cathode thereof is connected to the output terminal of the timer 13.

Figure 9:
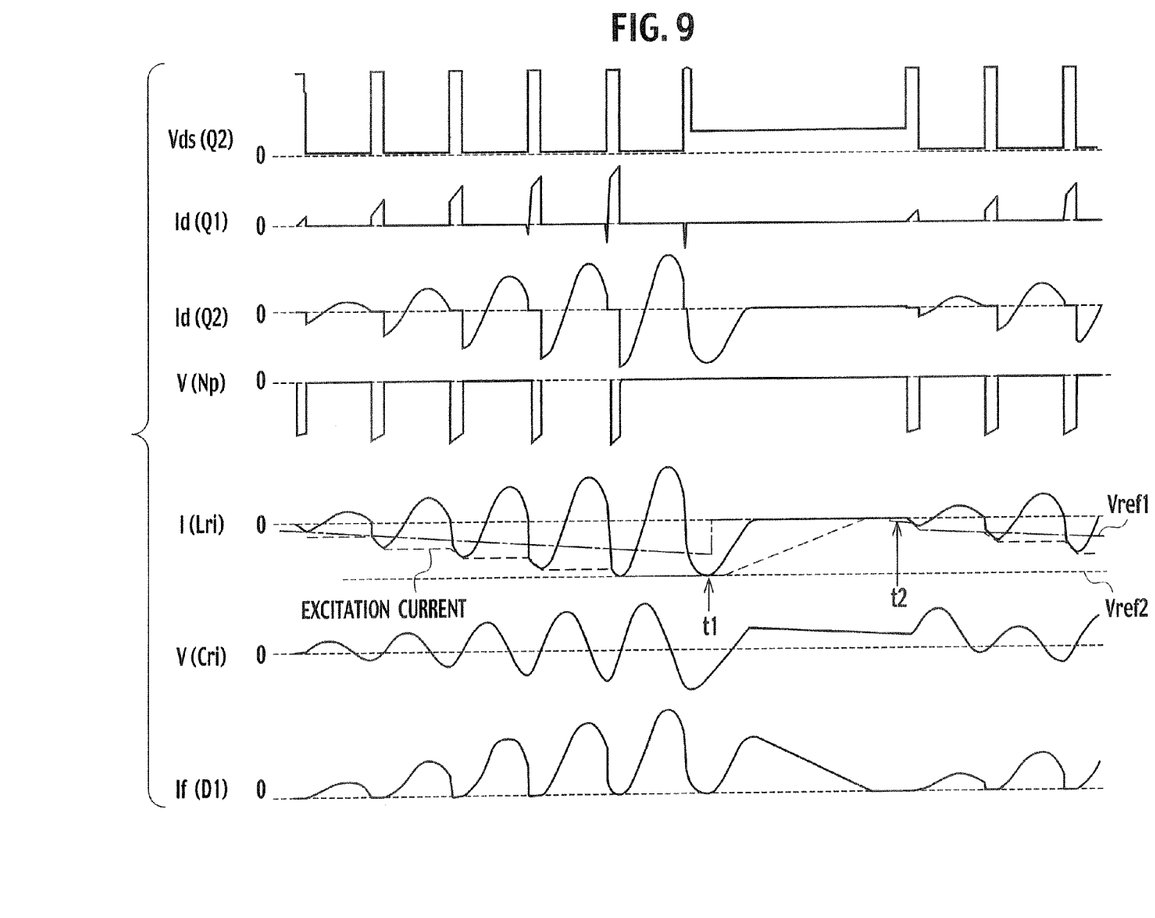
FIG. 9 shows operational waveforms of the apparatus according to the third embodiment.

FIG. 9 shows operational waveforms of the third embodiment. As explained above, an output voltage of the power source apparatus is low at the start of the apparatus, and therefore, an excitation current of the primary winding Np indicated with a dotted line in FIG. 9 is not reset within an ON period of the second switching element Q2 and gradually increases.

At time t1, the voltage of the resistor Roc reaches the reference voltage Vref2. Then, the third embodiment keeps the first switching element Q1 in an OFF state for a predetermined period. During this period, the first switching element Q1 is not turned on even at the ON timing of the first switching element Q1 specified by the flip-flop FF. Consequently, the first and second switching elements Q1 and Q2 are kept off for the predetermined period. During this period, the excitation current is gradually reset through a body diode of the second switching element Q2. At the same time, the capacitor C3 is discharged through the diode D3 so that the reference voltage Vref1 sharply decreases.

After passing the predetermined period from the time t1, the first switching element Q1 again turns on at time t2. At this time, the excitation current of the primary winding Np has already been reset, and therefore, no steep current flows but the current gradually increases. At the time t2, the switching operation of the first and second switching elements Q1 and Q2 resumes with the decreased reference voltage Vref1. Thereafter, the capacitor C3 is gradually charged with a time constant determined by the capacitor C3 and resistor R4, to thereby increase the reference voltage Vref1.

After resuming the switching operation of the first and second switching elements Q1 and Q2, an increasing rate of current passing to the first and second switching elements Q1 and Q2 is suppressed. The above-mentioned operation is repeated to send energy to the secondary side. If the output voltage of the apparatus increases to some extent, the excitation current will be completely reset within an ON period of the second switching element Q2, to thereby establish a normal operation.

Fourth Embodiment

Figure 10:
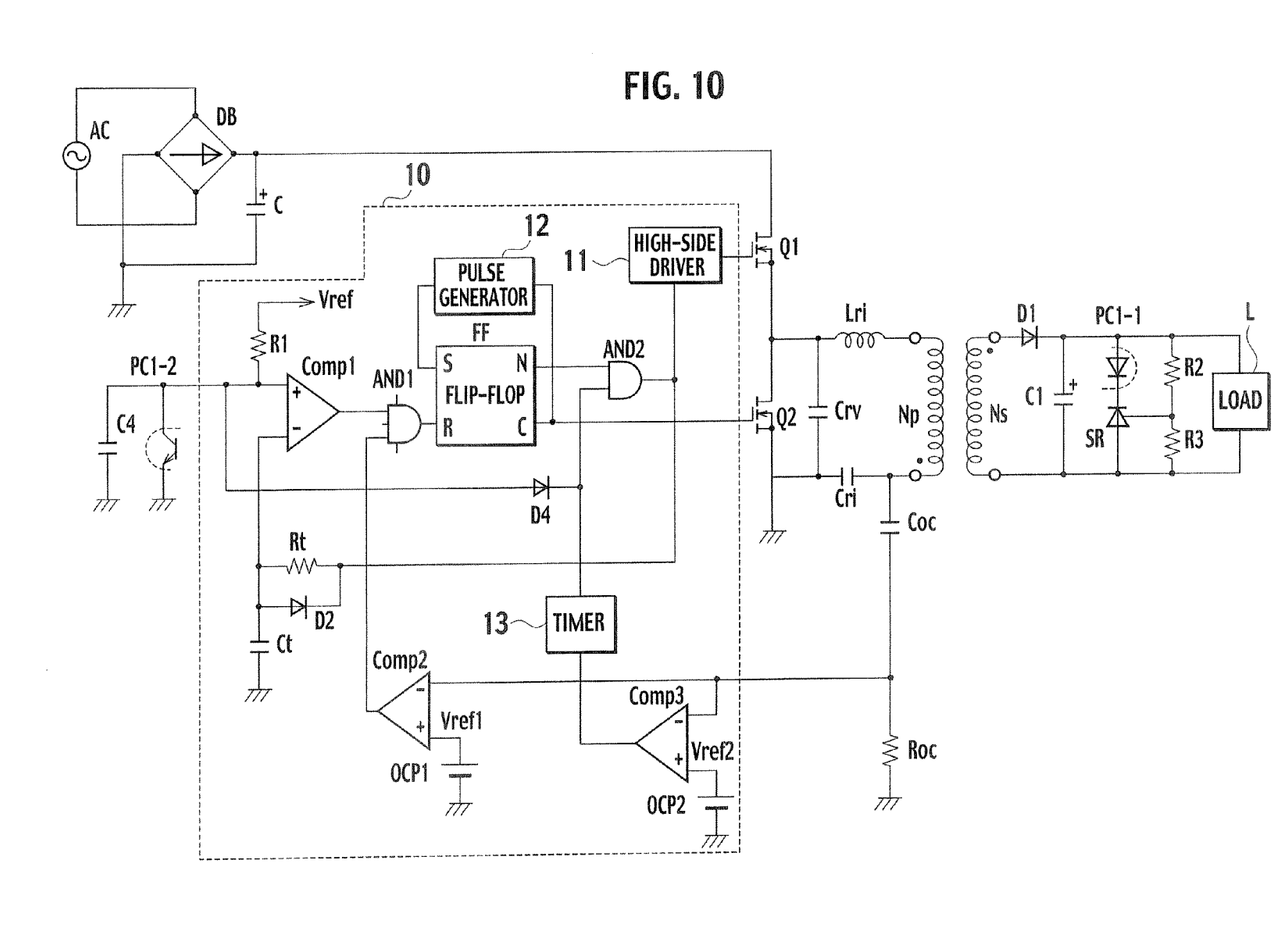
FIG. 10 is a circuit diagram showing a resonant switching power source apparatus according to a fourth embodiment of the present invention.

FIG. 10 is a circuit diagram showing a resonant switching power source apparatus according to the fourth embodiment. This embodiment is based on the first embodiment shown in FIG. 4, and therefore, the same parts as those of the first embodiment are represented with the same reference marks to omit or simplify their explanations. The fourth embodiment additionally includes a soft start circuit having a capacitor C4 and a diode D4.

The capacitor C4 is connected in parallel with the photocoupler receiver PC1-2. An anode of the diode D4 is connected to a first end of the capacitor C4, i.e., a connection point between the photocoupler receiver PC1-2 and the non-inverting terminal (+) of the comparator Comp1. A cathode of the diode D4 is connected to the output terminal of the timer 13.

At the start of the resonant switching power source apparatus, a voltage of the capacitor C4 gradually increases from an initial value of 0 V according to a time constant determined by the resistor R1 and capacitor C4. The resistor R1 is connected between the reference power source Vref and the capacitor C4. This function is equivalent to gradually increasing a voltage value of the reference power source Vref that determines an ON period of the first switching element Q1. Namely, this is a soft start function of gradually increasing the ON period of the first switching element Q1 from an initial value.

The capacitor C4 and timer 13 are connected through the diode D4 to each other. When the voltage of the resistor Roc reaches the reference voltage Vref2 at the start of the power source apparatus, the first and second switching elements Q1 and Q2 are kept in an OFF state for a predetermined period. During this period, an excitation current is gradually reset through a body diode of the second switching element Q2.

At the same time, the capacitor C4 is discharged through the diode D4, to achieve a soft start in resuming the switching operation of the first and second switching elements Q1 and Q2. Accordingly, the fourth embodiment provides the same effect as the third embodiment.

Effect of the present invention will be summarized. At the start of or in an overload state of the resonant switching power source apparatus of the present invention, an output voltage of the apparatus drops so that an excitation current is insufficiently reset with ON/OFF operation of the first and second switching elements. Then, the present invention turns off the first and second switching elements for a predetermined period to reset the excitation current, thereby preventing an excessive current from passing to the first and second switching elements. Namely, the present invention surely prevents breakage of the first and second switching elements.

The present invention is applicable to resonant switching power source apparatuses employing switching elements whose current resistivity is low.

This application claims benefit of priority under 35USC §119 to Japanese Patent Applications No. 2006-007879, filed on Jan. 16, 2006, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A resonant switching power source apparatus comprising:
   a first switching element and a second switching element that are connected in series between output terminals of a DC power source and are alternately turned on and off;
   a series resonant circuit having a primary winding of a transformer and a current resonance capacitor and connected in parallel with the second switching element;
   a controller configured to control ON/OFF operation of the first and second switching elements;
   a rectifying/smoothing circuit configured to rectify and smooth a voltage, which is generated on a secondary winding of the transformer during an ON period of the second switching element controlled by the controller, and output the rectified-smoothed voltage; and
   a current detector configured to detect a current passing through the series resonant circuit; and
   an over current protector of the controller configured to turn off the first and second switching elements for a predetermined period to reset excitation energy of the transformer as the current detector detects a predetermined current value.

2. The resonant switching power source apparatus of claim 1, wherein the controller comprises:
   a first overcurrent detector configured to detect whether or not a current passing through the series resonant circuit is equal to or larger than a first current value;
   a second overcurrent detector configured to detect whether or not the current passing through the series resonant circuit is equal to or larger than a second current value that is larger than the first current value;
   a first overcurrent protector configured to turn off the first switching element as the first overcurrent detector detects the first current value; and
   a second overcurrent protector configured to turn off the first and second switching elements for a predetermined period so that excitation energy of the transformer is reset, as the second overcurrent detector detects the second current value.

3. The resonant switching power source apparatus of claim 1, wherein the controller comprises:
   a first overcurrent detector configured to detect whether or not a current passing through the series resonant circuit has a first current value;
   a second overcurrent detector configured to detect whether or not the current passing through the series resonant circuit has a second current value that is larger than the first current value;
   a first overcurrent protector configured to turn off the first switching element as the first overcurrent detector detects the first current value; and
   a second overcurrent protector configured to turn off the first and second switching elements for a predetermined period so that excitation energy of the transformer is reset, as the second overcurrent detector detects the second current value.

4. The resonant switching power source apparatus of claim 2, wherein:

as the second overcurrent detector detects the second current value, the controller gradually increases the first current value to be detected by the first overcurrent detector from an initial value.

5. The resonant switching power source apparatus of claim 2, wherein as the second overcurrent detector detects the second current value, the controller gradually increases the ON period of the first switching element from an initial value.

6. A method of controlling a resonant switching power source apparatus having a first switching element and second switching element that are connected in series between output terminals of a DC power source and are alternately turned on and off, a series resonant circuit containing a primary winding of a transformer and a current resonance capacitor and connected in parallel with the second switching element, and a controller configured to control ON/OFF operation of the first and second switching elements, the method comprising:

detecting a current passing through the series resonant circuit;

detecting whether or not the detected current is equal to or larger than a first current value;

detecting whether or not the detected current is equal to or larger than a second current value that is larger than the first current value;

as the first current value is detected, turning off the first switching element; and as the second current value is detected, turning off the first and second switching elements for a predetermined period so that excitation energy of the transformer is reset.

7. A method of controlling a resonant switching power source apparatus having a first switching element and second switching element that are connected in series between output terminals of a DC power source and are alternately turned on and off, a series resonant circuit containing a primary winding of a transformer and a current resonance capacitor and connected in parallel with the second switching element, and a controller configured to control ON/OFF operation of the first and second switching elements, the method comprising:

detecting a current passing through the series resonant circuit;

detecting whether or not the detected current of the series resonant circuit is equal to or larger than a first current value;

detecting a current passing through the second switching element;

detecting whether or not the detected current of the second switching element is equal to or larger than a second current value that is larger than the first current value;

as the first current value is detected, turning off the first switching element; and as the second current value is detected, turning off the first and second switching elements for a predetermined period so that excitation energy of the transformer is reset.

* * * * *